United States Patent
Frader-Thompson et al.

(10) Patent No.: US 9,638,431 B2
(45) Date of Patent: May 2, 2017

(54) ENHANCED PREMISES MONITORING AND/OR CONTROL

(71) Applicant: EnergyHub, Inc., Brooklyn, NY (US)

(72) Inventors: Seth Frader-Thompson, Brooklyn, NY (US); Michael DeBenedittis, Brooklyn, NY (US); Andrew Martin, Brooklyn, NY (US); Joshua Oberwetter, Brooklyn, NY (US); Michele Tepper, Brooklyn, NY (US)

(73) Assignee: ENERGYHUB, INC., Brooklyn, NY (US)

( * ) Notice: Subject to any disclaimer, the term of this patent is extended or adjusted under 35 U.S.C. 154(b) by 878 days.

(21) Appl. No.: 13/708,100

(22) Filed: Dec. 7, 2012

(65) Prior Publication Data

US 2013/0184874 A1   Jul. 18, 2013

Related U.S. Application Data

(60) Provisional application No. 61/460,774, filed on Dec. 8, 2011.

(51) Int. Cl.
| | |
|---|---|
| *G05B 11/01* | (2006.01) |
| *F24F 11/00* | (2006.01) |
| *G05D 23/19* | (2006.01) |
| *G05B 15/00* | (2006.01) |
| *G05D 23/00* | (2006.01) |

(52) U.S. Cl.
CPC ...... *F24F 11/0001* (2013.01); *F24F 11/0012* (2013.01); *F24F 11/0034* (2013.01); *G05D 23/1904* (2013.01); *G05D 23/1905* (2013.01)

(58) Field of Classification Search
CPC .............. F24F 11/0001; F24F 11/0012; F24F 11/0034; G05D 23/1905; G05D 23/1904
See application file for complete search history.

(56) References Cited

U.S. PATENT DOCUMENTS

| | | | | |
|---|---|---|---|---|
| 5,559,301 | A * | 9/1996 | Bryan et al. | ..................... 84/653 |
| 7,647,137 | B2 * | 1/2010 | Schindler | ............... G06Q 10/04 |
| | | | | 700/16 |
| 2007/0043478 | A1 * | 2/2007 | Ehlers et al. | ................. 700/276 |
| 2011/0214060 | A1 * | 9/2011 | Imes et al. | ..................... 715/735 |
| 2016/0170626 | A1 * | 6/2016 | Fadell | ................ G05D 23/1902 |
| | | | | 715/727 |

\* cited by examiner

*Primary Examiner* — Kenneth M Lo
*Assistant Examiner* — Sunray R Chang
(74) *Attorney, Agent, or Firm* — Amin, Turocy & Watson, LLP

(57) ABSTRACT

Enhancements to premises monitor or control device (e.g., thermostats, etc) are detailed herein. For example, enhanced relating to simplification of scheduling, are described as well as other enhancements relating to reducing device costs or consumption costs, providing richer features or more robust feature sets, and/or delivering associated product or services with increased simplicity, convenience, or ease.

20 Claims, 13 Drawing Sheets

PRIOR ART DEVICE MEMORY

| Monday | Tuesday | Wednesday | Thursday | Friday | Saturday | Sunday |
|---|---|---|---|---|---|---|
| SET POINT 1 | SET POINT 1 | SET POINT 1 | SET POINT 1 | SET POINT 1 | SET POINT 1 | SET POINT 1 |
| SET POINT 2 | SET POINT 2 | SET POINT 2 | SET POINT 2 | SET POINT 2 | SET POINT 2 | SET POINT 2 |
| SET POINT 3 | SET POINT 3 | SET POINT 3 | SET POINT 3 | SET POINT 3 | SET POINT 3 | SET POINT 3 |
| SET POINT 4 | SET POINT 4 | SET POINT 4 | SET POINT 4 | SET POINT 4 | SET POINT 4 | SET POINT 4 |

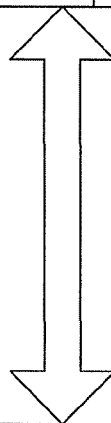

PRIOR ART USER INTERFACE

- Mimics the grid layout of the storage layer, so programming is more difficult/counterintuitive
- Most users do not program effectively, so resources are often wasted
- Designed to operate independently of other devices, with no or limited integration
- Features are either severely limited or very expensive
- Potential savings and efficiencies often go unrealized

FIG. 2

EXAMPLE CONFIGURATION DISPLAY 108

EXAMPLE SELECTION DISPLAY

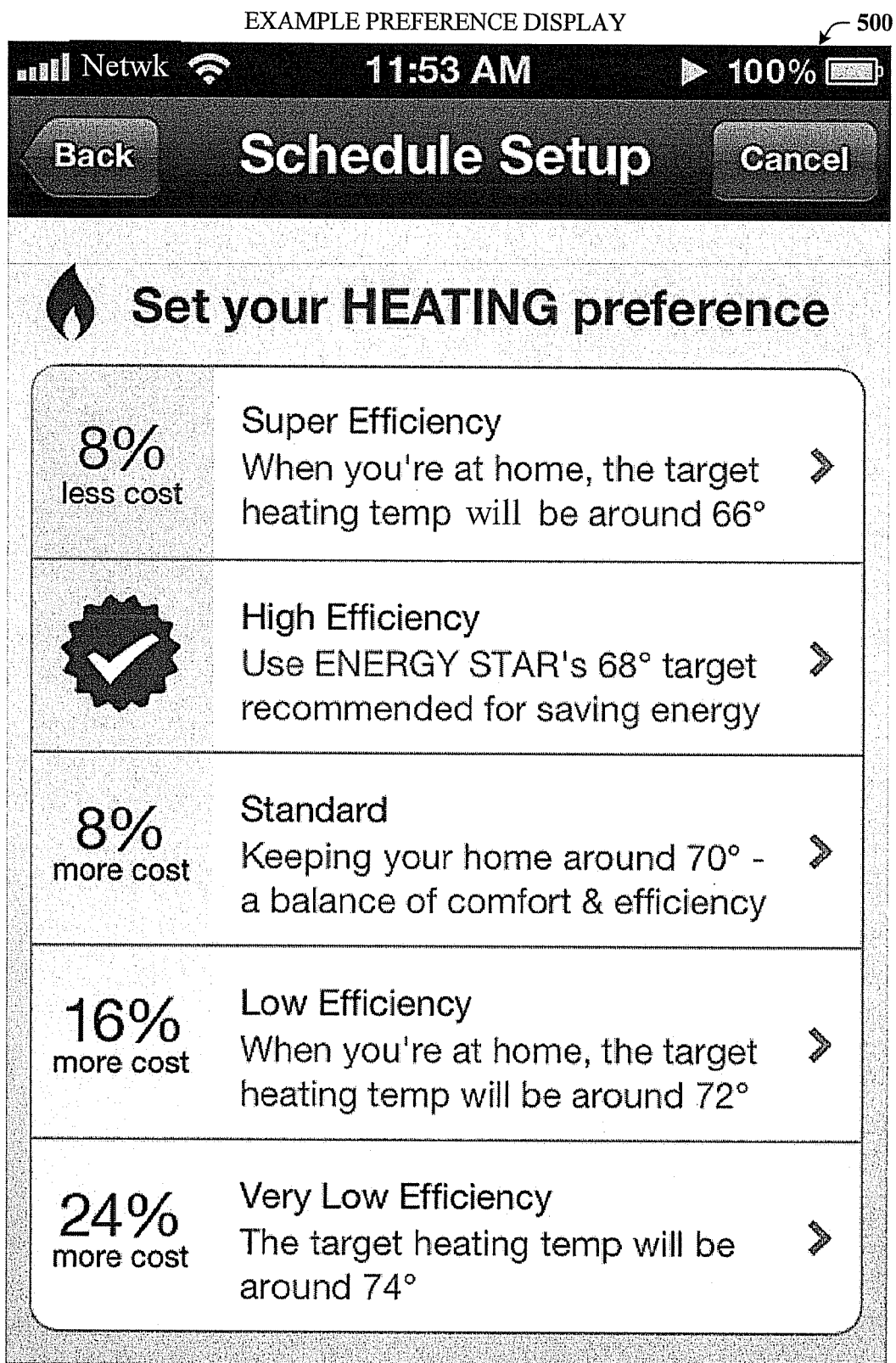
FIG. 5A  502 — PREFERENCE DATA

EXAMPLE PREFERENCE DISPLAY

Occupancy Schedule

| Time of Day | Time | Mon-Fri Occupied | Sat-Sun Occupied |
|---|---|---|---|
| Morning | 7:00 a | Upstairs Living Room | Upstairs Living Room |
| Day | 8:00 a | none | Upstairs Living Room Basement |
| Evening | 7:00 p | Living Room Basement | Upstairs Living Room Basement |
| Night | 11:00 p | Upstairs | Upstairs |

Edit

FIG. 6A

Edit Occupancy

Mon-Fri

| Time of Day | Time | Upstairs | Living Room | Basement |
|---|---|---|---|---|
| Morning | 7:00 a | ☑ | ☑ | ☐ |
| Day | 8:00 a | ☐ | ☐ | ☐ |
| Evening | 7:00 p | ☐ | ☑ | ☑ |
| Night | 10:00 | ☑ | ☐ | ☐ |

Sat-Sun

| Time of Day | Time | Upstairs | Living Room | Basement |
|---|---|---|---|---|
| Morning | 7:00 a | ☑ | ☑ | ☐ |
| Day | 8:00 a | ☑ | ☑ | ☑ |
| Evening | 7:00 p | ☑ | ☑ | ☑ |
| Night | 10:00 | ☑ | ☐ | ☐ |

Save

FIG. 6B

ENHANCED PREMISES MONITORING AND/OR CONTROL

CROSS-REFERENCE TO RELATED APPLICATIONS

This application claims priority to U.S. Provisional Patent Application Ser. No. 61/460,774, filed Dec. 8, 2011, and entitled ENERGY MONITORING AND UTILIZATION ENHANCEMENTS. The entirety of this application is incorporated herein by reference.

TECHNICAL FIELD

This disclosure generally relates to enhancing premises monitor and/or control, for example, by facilitating enhanced features, convenience, and/or accessibility in connection with premises monitoring or control.

BACKGROUND

Existing home energy control and automation technology, or other premises monitor and control, was architected to operate relatively independently of other devices or technology. For example, such premises monitor devices are not designed to offload or share processing loads, share data storage, or otherwise interact with other systems or devices for which such might be beneficial. Likewise, conventional devices are not architected to take advantage of being part of a remote access networked system. As a result, most such devices have limited feature sets and/or high costs for the features that do exist.

For example, conventional thermostats or other premises monitor and control devices often rely upon legacy technology or outdated paradigms. As a result, programming or accessing these devices can be difficult and particularly counterintuitive to users who are much more familiar with modern paradigms and designs. Because these conventional devices are generally quite difficult to use, potential benefits, even if they exist, go unimplemented. For example, understanding the features and abilities of the thermostat can lead to energy-cost savings opportunities, can avoid unnecessary waste of natural resources, as well as other advantages. Unfortunately, most users do not have sufficient understanding of their thermostat(s) or other premises monitor and control devices to leverage such advantages. Generally, this situation exists because conventional devices do not provide adequate features, convenience, and/or accessibility.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Certain subject matter disclosed herein relates to simplified programming or schedule editing of a premises monitor and/or control device. One system disclosed herein can include a premises monitor and/or control device that can facilitate a change to a state of a premises. The premises monitor and/or control device can include a processor that can execute computer executable components stored in a memory.

One such component can be a presentation component that can present a configuration display associated with a defined time period. The configuration display can include a threshold associated with the state of the premises. A data component can determine threshold data associated with the threshold based on input data input to the configuration display for the defined time period. A population component can populate multiple data structures included in the memory with the threshold data based on a type of the configuration display. A data structure from the multiple data structures can relate to a single defined time period.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which:

FIG. 2 illustrates a block diagram of prior art device memory and the relationship of the memory structure to prior art device user interfaces;

FIG. 5A depicts an example illustration of an example preference display in accordance with certain embodiments of this disclosure;

FIGS. 6A and 6B depict illustrations that relate to example occupancy schedules that can be associated with the occupancy of a portion of the premises during defined time period in accordance with certain embodiments of this disclosure;

DETAILED DESCRIPTION

Schedule Simplification and/or Abstraction

Figure 1:
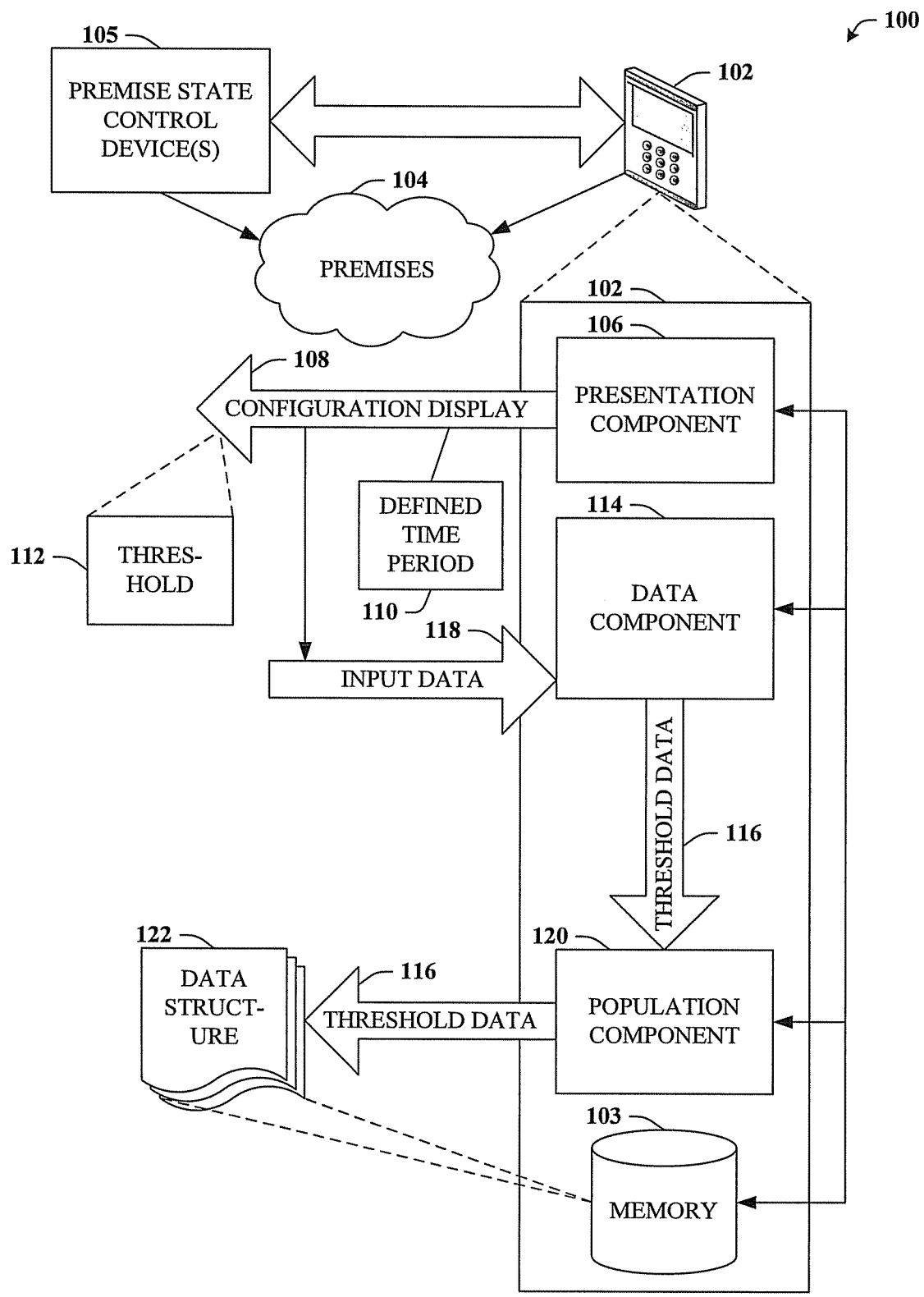
FIG. 1 illustrates a high-level functional block diagram of an example system that can facilitate simplified programming of a premises monitor and/or control device as well as additional features, convenience, or ease in accordance with certain embodiments of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

Referring now to drawings, with initial reference to FIG. 1, system 100 is depicted. System 100 can facilitate simplified programming to a premises monitor and/or control device as well as additional features, convenience, or ease. System 100 can include premise monitor and/or control device 102 that can facilitate a change to premises 104. Device 102 can include memory 103 and a processor (not shown), examples of which are provided in connection with FIG. 11. Moreover, the processor can be configured to execute various components described herein.

Premises 104 can be, for example, a residential area, a commercial area, an industrial area, or substantially any type of area or location and can include indoor portions or outdoor portions depending on a type of premises monitor and/or control device 102. In many examples utilized herein, device 102 is depicted as a thermostat device that can, inter alia, facilitate monitoring and control of an indoor environment, particularly temperature, however, it is understood that device 102 is not necessarily limited to a thermostat. In other embodiments device 102 can relate to irrigation systems (indoors or outdoors); lighting control systems (e.g., lights, shades, etc.); pools, hot tubs, aquariums, water heaters, or other fluid- or water-based systems; and so on.

Moreover, in some embodiments device 102 can directly affect the change to the state of premises 104, while in other embodiments device 102 can facilitate the change by instructing other devices, such as other existing thermostats or premises monitor and control devices or premise state control device(s) 105, which can be, e.g., a heating, ventilation, and air conditioning (HVAC) system or another system suitable for the particular implementation.

One shortcoming of conventional thermostats or other monitor/control systems is that an associated user interface employed to program these devices is architected to imitate the memory structure as illustrated by FIG. 2, which can now be referenced before continuing the description of FIG. 1. FIG. 2 depicts an example of memory 200 associated with a prior art premises monitor and control device. A typical design includes enough memory to store a week's worth of information (e.g., 7 days), with four setpoints per day, creating a 7×4 grid. An associated user interface 220 is typically architecturally tied to this grid-based layout, a situation that arose because of limited device display size, cost-centric display technology (e.g., fixed segment liquid crystal display (LCD) instead of full color touchscreen), etc. Regardless, user interface 220 tends to mimic the storage layer, which can lead to difficulties when programming the device, which can result in little or inefficient use of the device.

Turning back to FIG. 1, system 100 can operate to effectively separate the presentation layer from the storage/implementation layer. In other words, what is displayed by a user interface associated with system 100 can be a different, typically more intuitive, representation of data that is stored in the memory or in a remote memory. For example, system 100 can include presentation component 106 that can include all or a portion of a user interface (e.g., display, touchscreen, buttons, speaker, microphone, etc.) associated with device 102.

Presentation component 106 can be configured to present configuration display 108 associated with defined time period 110. For example, in some embodiments, defined time period 110 can be a day, which is typically a 24-hour period. In addition, configuration display 108 can include threshold 112 associated with the state of premises 104. In embodiments where device 102 is a thermostat or a similar device, threshold 112 can be associated with a temperature measurement, which is further detailed in connection with FIG. 3. In embodiments where device 102 is a lighting or appliance controller or a similar device, threshold 112 can be associated with an illumination level or on/off state.

Device 102 can also include data component 114 that can be configured to determine threshold data 116. Threshold data 116 can be associated with threshold 112, and data component 114 can determine threshold data 116 based on input data 118 that can be input, or derived from input to configuration display 108 for defined time period 110. For example, in a simple case, data component 114 can determine threshold data 116 based upon an input to threshold 112 and/or defined time period (e.g., a user inputs a temperature of 75 degrees at a transition time of 7:00 am). In other examples, data component 114 can determine threshold data 116 based upon various other inputs, settings, and/or preferences, which is further described in connection with FIGS. 4-7.

Additionally, device 102 can include population component 120 that can receive threshold data 116. Population component 120 can be configured to populate multiple data structures 122 included in memory 103 with threshold data 116. The number of data structures 122 populated with threshold data 116 can be based on a type associated with configuration display 108 and a given data structure 122 from the multiple data structures 122 can relate to a single defined time period 110 (e.g., a day).

It is understood that memory 103 is intended to be a repository of all or portions of data, data sets, or information described herein or otherwise suitable for use with the disclosed subject matter. Memory 103 can be centralized, either remotely or locally cached, or distributed, potentially across multiple devices and/or schemas. Furthermore, memory 103 can be embodied as substantially any type of memory, including but not limited to volatile or non-volatile, solid state, sequential access, structured access, random access and so on. It should be understood that all or portions of memory 103 can be included in device 102, or can reside in part or entirely remotely from device 102.

Figure 3:
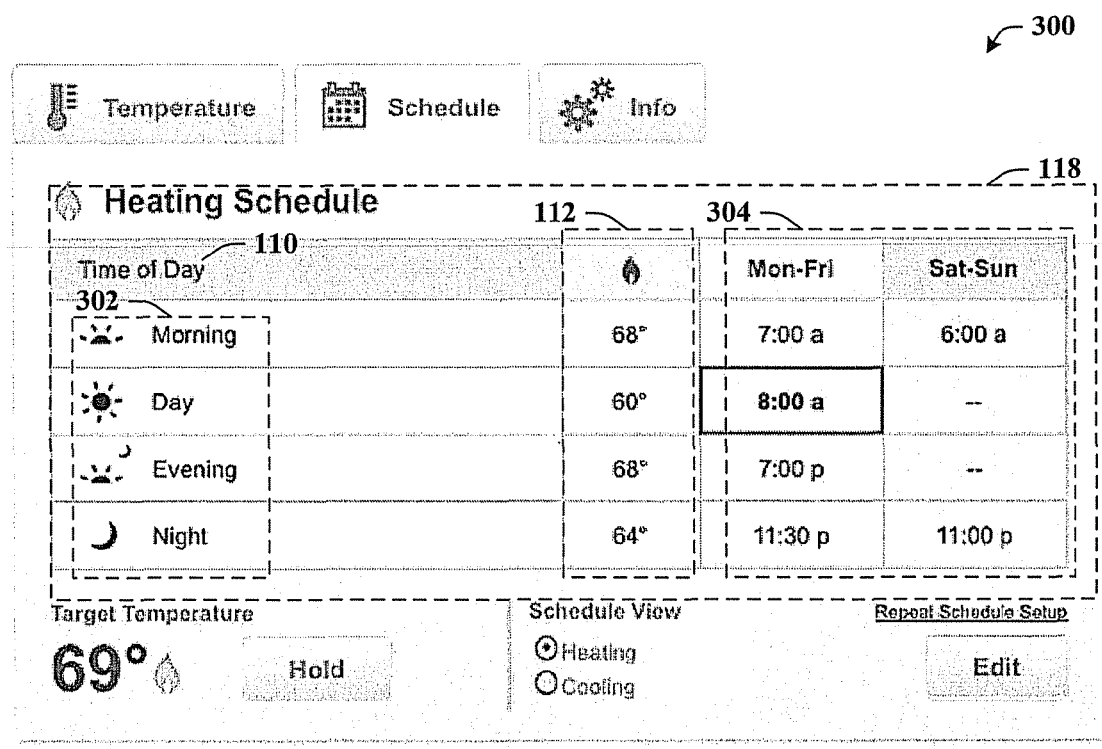
FIG. 3 depicts an example illustration of a configuration display in accordance with certain embodiments of this disclosure.

Turning now to FIG. 3, graphical illustration 300 is depicted. Illustration 300 provides one example of configuration display 108. Suppose memory 103 of device 102 is similar to that of prior art device memory 200 or, as another example, device 102 is configured to interface with prior art device memory 200, in which case memory 103 can include prior art device memory 200 as well as other memory portions that are local or remote and can be accessed by way of a bus or hard line as well as wirelessly. In any suitable scenario, configuration display 108 can represent a portion of a user interface that separates the presentation layer (e.g., displays or other user interface features provided by presentation component 106) from the storage layer. Such can enable scheduling/programming that is more intuitive, more convenient, and simpler.

In this case, defined time period 110 is a day and within that day four transition labels 302 are provided, denoted "Morning," "Day", "Evening," and "Night," which, in embodiments where device memory 200 is used, can map to the four setpoints allowed per day in device memory 200. It is understood that if device memory 200 only supports, e.g., two setpoints per day, then four transition labels 302 can still be provided by configuration display 108. In that case, population component 120 can populate the first two setpoints with the associated values at suitable times, and then overwrite those same two memory locations with the next set of associated values after the first two transition times 304 are no longer active. In effect, configuration display 108 can provide substantially any number of transition labels 302 regardless of the limitation of the device memory 200 in a similar fashion, and each can seamlessly be translated to device memory 200 at the appropriate times.

Configuration display 108 can include thresholds 112, that can represent a threshold temperature at which a change to the state of premises 104 is facilitated, and transition times 304 that can represent the time of day (or other defined time period 110) at which an associated threshold 112 is to begin its comparison with the ambient temperature to determine whether a change to the state of premises 104 is to be invoked (e.g., instructing a furnace or another component of an HVAC system to activate). Configuration display 108 can allow inputs to be made to thresholds 112 or transition times 304 or to other portions and can also allow for these and other values to be automatically populated based upon other data included in memory 103. For example, as is further detailed in connection with FIGS. 5-7, a user might simply input suitable times for transition times 304, and data component 114 can determine the associated thresholds 112, for example based upon energy preferences, comfort preferences, occupancy, and so forth. Moreover, all or portions of data included in configuration display 108 can be included in input data 118 and/or used to derive input data 118.

Numerous advantages exist for this example configuration display 108 over similar prior art displays or user interfaces. As noted, system 100 can leverage other platforms and architectures that conventional devices are often incapable, which can lead to additional features. Furthermore, rather than programming setpoints for every day of the week, multiple days can be abstracted into a single day, which can simplify the tasks of programming and editing. In the provided example shown in FIG. 3, Monday-Friday can be accessed via a single interface element as can Saturday-Sunday. Population component 120 can automatically copy data to the relevant data structures included in memory 103 for each of the respective defined time periods 110.

Figure 4:
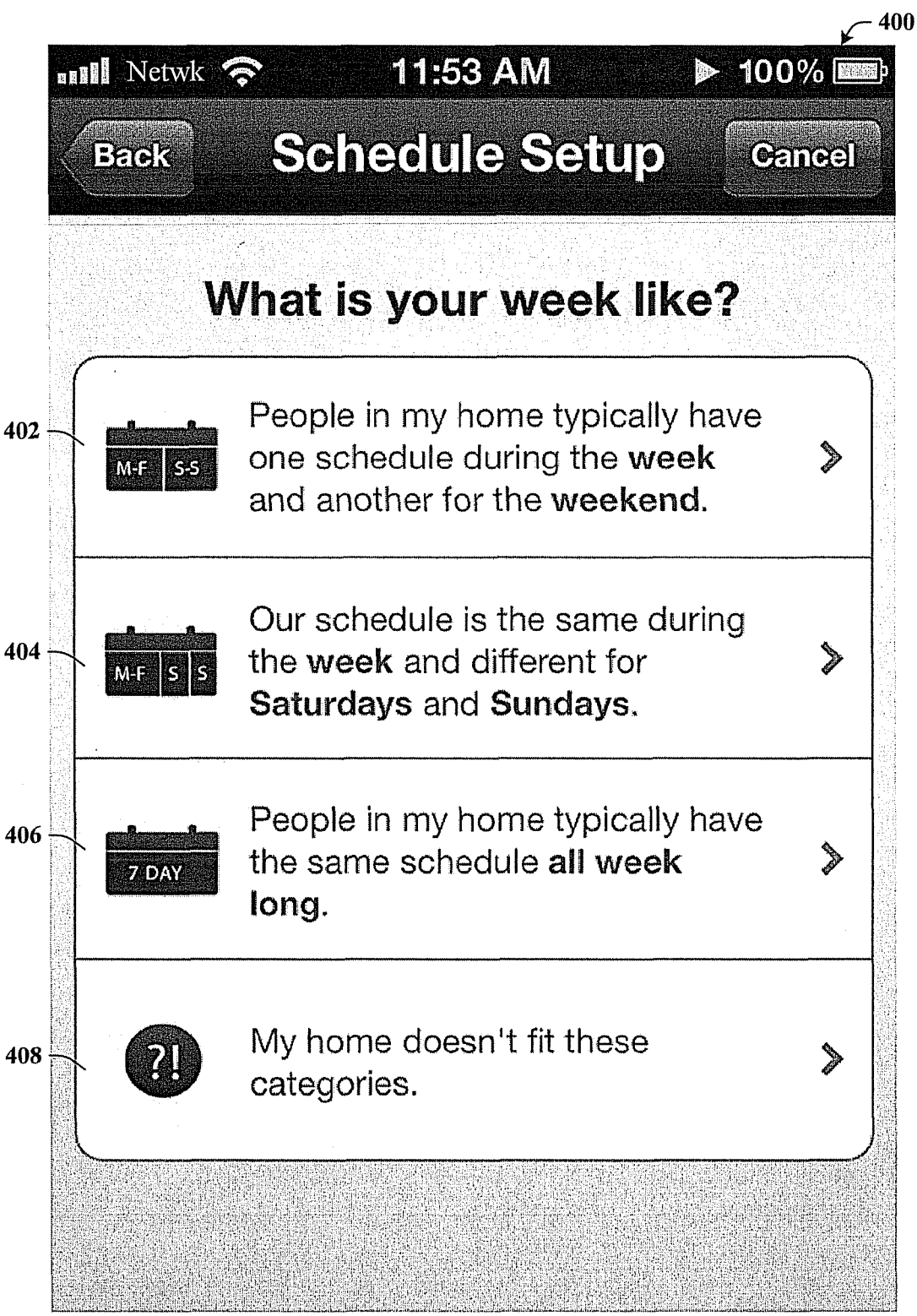
FIG. 4 depicts an example illustration of a selection display in accordance with certain embodiments of this disclosure.

Referring now to FIG. 4, graphical illustration 400 is depicted. Illustration 400 represents an example of a selection display. For example, in some embodiments, configuration display 108, or another portion of a user interface provided by presentation component 106, can include selection display 400 that can facilitate selection of the type of configuration display 108. As noted previously, population component 120 can populate multiple data structures included in memory 103 with threshold data 116 based upon the type of configuration display 108.

In some embodiments, for example, based upon a selection denoted by reference numeral 402, the type can be a 5-2 period display, so called because the display is divided into a 5 weekday period and a 2 weekend day period, an example of which was illustrated in FIG. 3. A 5-2 type display can facilitate input of a first set of input data 118 from which data component 114 can determine threshold data 116 that population component 120 utilizes to populate five data structures 122 included in memory 103 (e.g., for the example in FIG. 3, these five data structures 122 relate to Monday-Friday) and a second set of input data 118 from which data component 114 can determine threshold data 116 and population component 120 can utilize to populate two data structures 122 included in memory 103 (e.g., for the example in FIG. 3, these two data structures 122 relate to Saturday-Sunday).

In some embodiments, the type can be a 5-1-1 period display, so called because the display is divided into a 5 weekday period, 1 Saturday period, and 1 Sunday period, as denoted by reference numeral 404. A 5-1-1 period display can facilitate input of: a first set of input data 118 from which the data component 114 can determine the threshold data 116 that the population component 120 utilizes to populate five data structures 122 included in the memory 103, a second set of input data 118 from which the data component 114 determines the threshold data 116 that the population component 120 utilizes to populate one data structure 122 included in the memory 103, and a third set of input data 118 from which the data component 114 determines the threshold data 116 that the population component 120 utilizes to populate one data structure 122 included in the memory 103.

In some embodiments, the type can be a 7 period display, typically selected for premises 104 for which the routine is similar all seven days of the week, as denoted by reference numeral 406. A 7 period display can facilitate input of the input data 118 from which the data component 114 determines the threshold data 116 that the population component 120 utilizes to populate seven data structures 122 included in the memory 103. As denoted by reference numeral 408, other example types are possible.

With reference now to FIG. 5A, graphical illustration 500 is depicted. Illustration 500 represents an example of a preference display. For example, in some embodiments, configuration display 108, or another portion of a user interface provided by presentation component 106, can include preference display 500 that can facilitate input of preference data 502. Preference data 502 can also include energy pricing information, and in those cases, preference display 500 can include features that relate to cost-benefits associated with efficiency relative to comfort, which is further detailed infra.

In any case, preference data 502 can be included in input data 118, the aggregate of which can be employed by data component 114 to determine threshold data 116. Accordingly, turning back to FIG. 3, while a user can directly input values for thresholds 112, the values of thresholds 112 can also be automatically populated based upon the various other data inputs, such as preferences, costs, comfort levels, and so forth as well as based upon occupancy, which is detailed in connection with FIGS. 6A-7. It is understood that while configuration display 108 can provide a simplified and often more intuitive interface versus the traditional grid of conventional memory, configuration display 108 can also provide the full grid for advanced users or the like. When presenting the full grid, configuration display 108 can still provide advantageous over conventional systems given configuration display 108 can likely leverage a superior user interface than what is typically found on conventional devices.

Figure 5B:
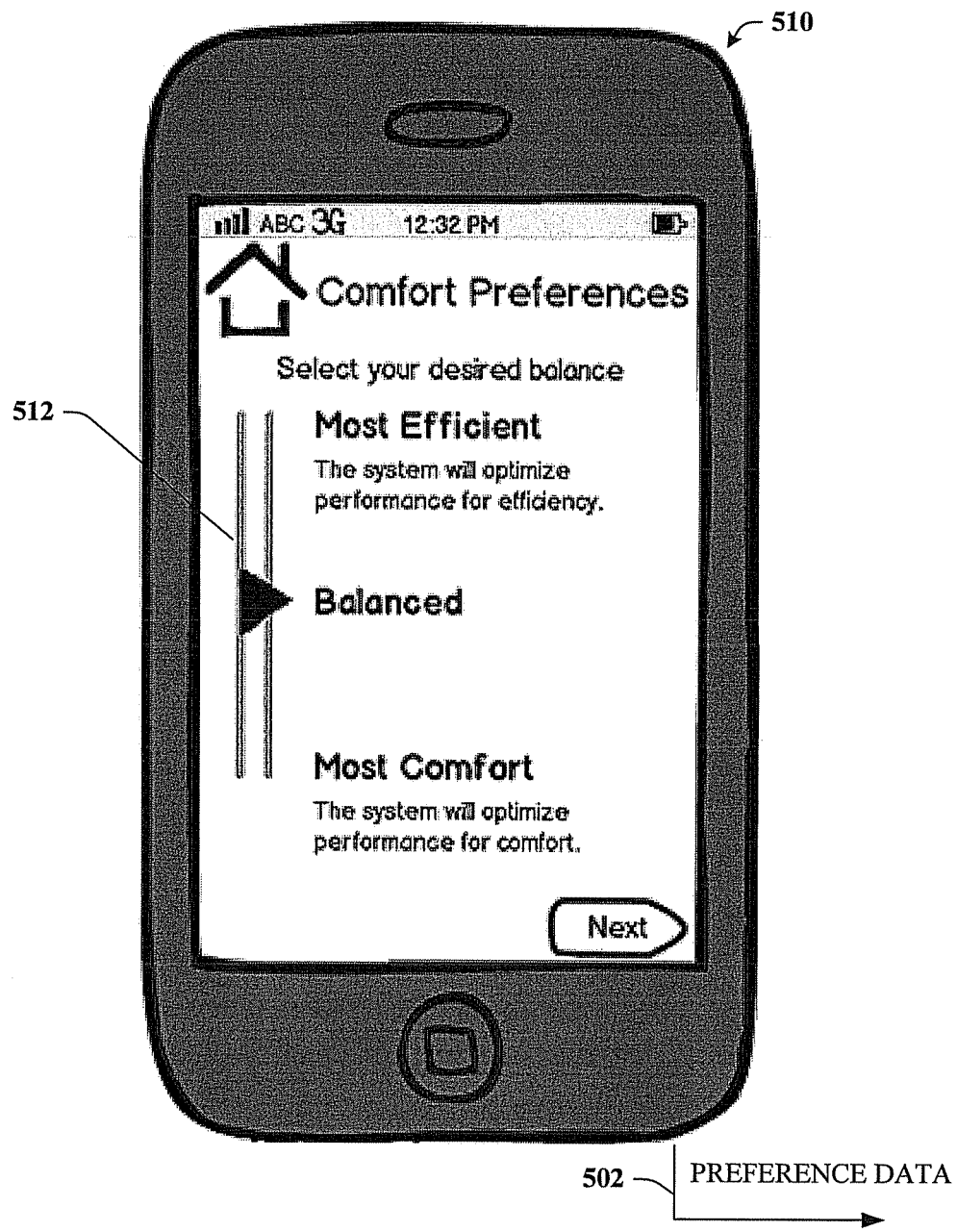
FIG. 5B depicts an example illustration of an example preference display that can facilitate abstraction selection of comfort versus efficiency in accordance with certain embodiments of this disclosure.

In some embodiments, presentation component 106 can provide a display that can facilitate abstract selection of comfort versus efficiency, an example of which is provided by illustration 510 associated with FIG. 5B, which can now be referenced. As depicted, a sliding scale between comfort and efficiency can exist (e.g., sliding scale 512), so an associated user is not required to consider specific temperature values, but rather can simply indicate general preferences that data component 114 can interpret. Thus, a user of premises 104 can be provided a convenient means for quickly and easily updating preference data 502 in a manner that is relevant for many users. In addition to automatically updating preference data 502 based upon changes to the sliding scale 512 (or another suitable user interface element), all or a portion of relevant threshold data 116 can be updated as well. It is understood that data component 114 can determine a particular threshold 112 directly in response to such preference data 502 or further based upon the preference data 502 interpreted in the context of local weather, a thermal model of premises 104, current energy prices and/or peak pricing or variable pricing indices, etc.

Turning now to FIGS. 6A and 6B, graphical illustrations 600 and 610 are depicted. Illustrations 600 and 610 relate to example occupancy schedules that can be associated with occupancy of a portion of premises 104 during defined time period 110. As with preference data 502, data component 114 can determine threshold data 116 further based on occupancy data 602 input to or otherwise included in occupancy displays 600 and 610.

As depicted occupancy schedule 600 is related to informational aspects of occupancy data 602 that can be reviewed for accuracy or settings. Occupancy display 600 can include a user interface element that can facilitate editing of occupancy data 602, such as edit button 604. In response to selection of edit button 604 or another similar user interface element, example edit occupancy display 610 can be presented, wherein the occupancy data can be edited based upon defined portions of premises 104 and saved by way of save button 606 or a like user interface element. In another embodiment, the occupancy schedule 600 can be presented as a visual map that represents the physical regions of the premises 104 that can be individually managed by the premise monitor and control device 102. In another embodiment, the occupancy schedule 600 includes a user interface element that facilitates editing of the occupancy zones (e.g., the physical regions of premises 104 that can be individually managed), including adding, removing, or renaming the zones.

In response to preference data 502, occupancy data 602, and/or other input data 118, data component 114 can translate such input data 118 to set thresholds 112 and/or transition times 302 for all relevant premises state control devices 105 at premises 104 (e.g., thermostats, automated lighting, shades, etc.) based on various occupancy periods and premises 104 locations as well as comfort, efficiency, or other preference data 502 settings. In other words, configuration display 108 can be presented with data translated into specific transition times that each control device understands and stores locally (e.g., in device memory 200) or into transition times 304 and thresholds 112 that a master networked system uses to send control commands to other relevant control devices at appropriate times.

Figure 7:
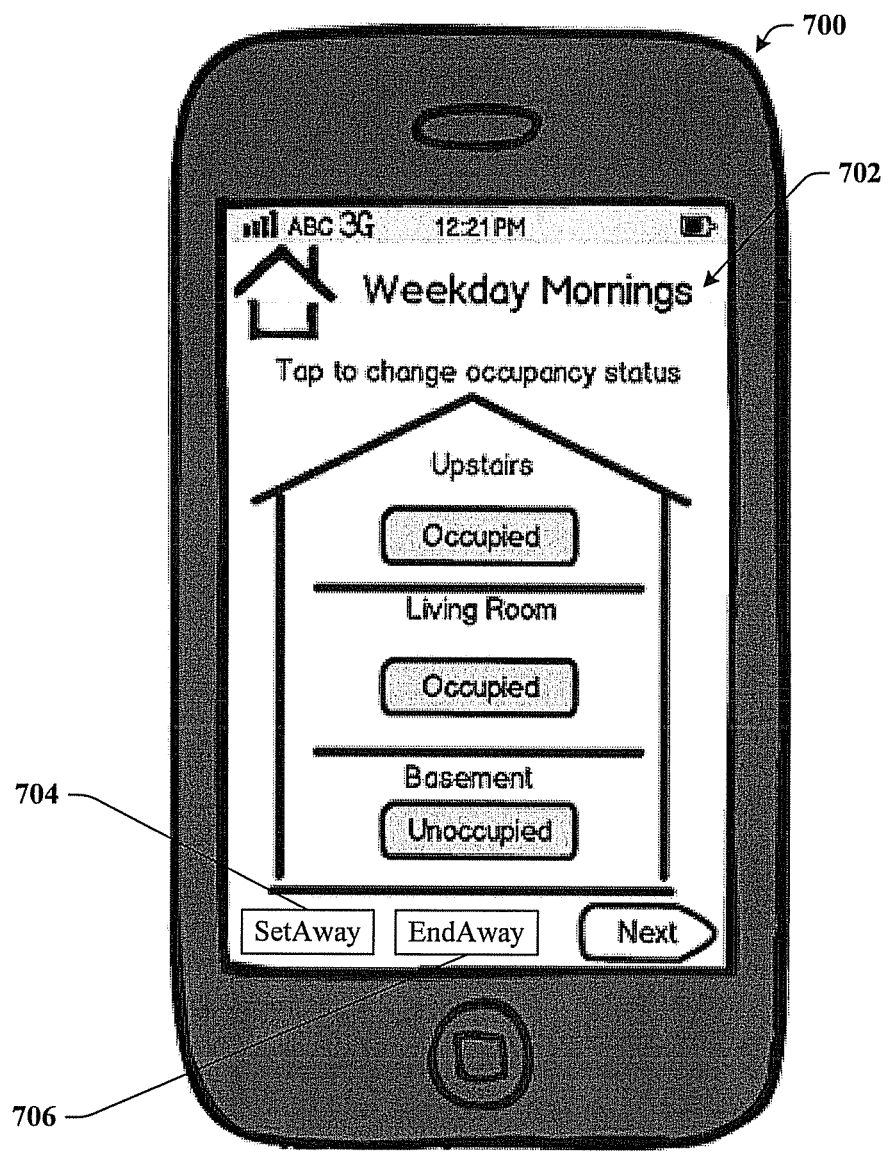
FIG. 7 illustrates an example interface device with suitable display for presenting an editable view of occupancy data or other data detailed herein in accordance with certain embodiments of this disclosure.

Referring now to FIG. 7, system 700 is provided. System 700 can be a smart phone or any other suitable device with suitable display 702 for presenting an editable view of occupancy data 602 (or other data detailed herein). By way of example, suitable devices can include a home controller device, a personal computer, a mobile phone, a personal digital assistant, a tablet, a gaming console, and so on. Display 702 provides a further embodiment associated with accessing or updating occupancy data, but also introduces additional aspects, features, and/or concepts associated with the disclosed subject matter.

For example, system 100 can leverage resources associated with other devices (e.g., smart phone 700), including the user interface, memory, processing, communications of those devices. Inputs to device 700 can be remote from system 100 and/or premises 104 and, if necessary, can be translated appropriately for all or a portion of the associated premises control devices 105 by data component 114, which can increase the features available to users as well as convenience.

In addition, display 702 is illustrated with set away button 704 and end away button 706 that relate to concepts that can be provided in other portions of configuration display 108 as well. Selection of set away button 704 (or another suitable user interface element) can essentially indicate to system 100 that all or a portion of premises 104 is not currently occupied according to the normal scheduling, such as during a vacation holiday or the like. Thus, data component 114 can manage threshold data 116 for example for maximum efficiency while occupants of premises 104 are away rather than according to the normal occupancy and preference settings. Hence, a single input stroke can initiate energy-saving modes for all suitable devices at premises 104 or multiple premises associated with a particular user. Energy-saving modes can differ based upon the particular device as well as based on various other settings or conditions such as weather (e.g., winter will likely be different than summer).

Similarly, changes that occur due to selection of set away button 704 can be deactivated by selection of end away button 706 (or a similar user interface element). Additionally or alternatively, away mode can be set for a predetermined length of time, until a previously scheduled non-away time (e.g., a subsequent schedule transition), indefinitely (e.g., until end away button 706 is selected or another indication that a user is at premises 104 is provided), or based upon location information associated with the user (e.g., location information indicates a user has arrived or is approaching premises 104), which is further detailed below. Additional aspects associated with the concept of setting and ending away statuses as well as an introduction to access sharing and other concepts are provided in connection with FIG. 8. Moreover, it is understood that any given interface portion that includes button 704 or 706 can provide the single stroke ability set or end an associated away status. Accordingly, it is not necessary that both buttons be available or displayed simultaneously. Rather, set away button 704 can be enabled/displayed when the current status is not set to away, while end away button 706 can be enabled/displayed when the current status is set to away.

Figure 8:
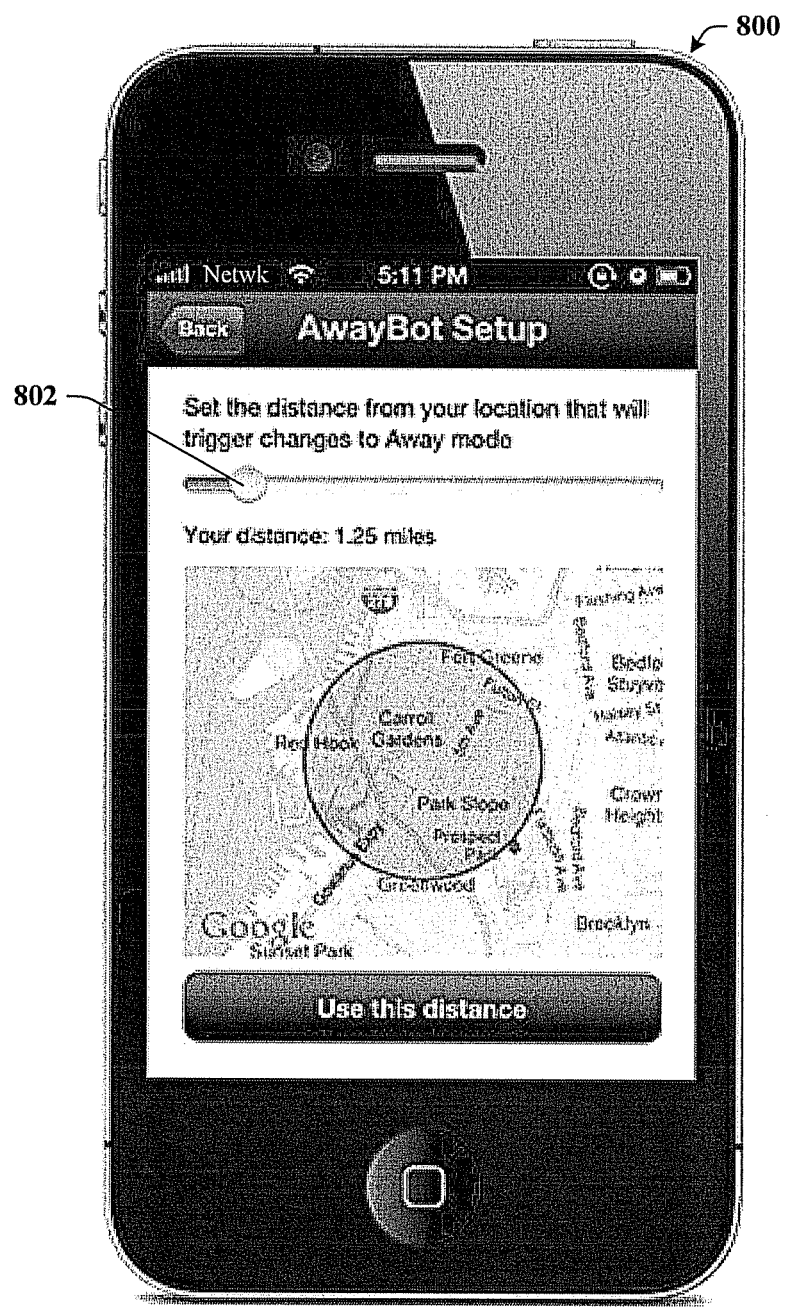
FIG. 8 illustrates an example interface device that includes location information associated with a user of the premises monitor and/or control device in accordance with certain embodiments of this disclosure.

Turning now to FIG. 8, system 800 is illustrated. System 800 can be a smart phone or another suitable device that includes location information associated with a user of system 100 and/or premises 104. In some embodiments, a location of the user (in this case determined by a location of a smart phone associated with the user) can be utilized by system 100 to automatically set a status associated with all or a portion of premises 104 to away mode. Moreover, other suitable location-based data can be employed to determine an estimated time of arrival at premises 104. Accordingly, changes to the state of premises (e.g., heating or cooling, lighting illumination, etc.) can be implemented for maximum efficiency or other parameters in view of current condition as well as the estimated time of arrival and/or based upon a distance threshold from premises 104. In some embodiments, this distance threshold can be set by distance slider 802 or another suitable user interface element or location-based element. For example, thresholds 112 can be targeted and/or achieved based upon the estimated time of arrival rather than or in addition to being based upon an associated transition time 302.

In some embodiments, a non-linear distance scale can be employed, which can be associated with distance slider 802. For example, fine settings can be affected when the distance from premises 104 is small or the travel speed high, while coarser settings can be affected when the distance from premises 104 is large or the travel speed low. It is understood that multiple devices and/or location-based data sources can be employed for multiple different occupants or users of premises 104, and each data set can be utilized to appropriately affect changes to the state of premises 104 or appropriate portions of premise 104. Additionally or alternatively, a user can be provided with an option to set different detection radii and/or distance thresholds based on the day of the week and time of day to accommodate for travel patterns associated with a user of premises 104.

Such also provides an introduction to the notion of shared access for system 100. Briefly, a given premises 104 can routinely include multiple authorized users, each of whom might have access a local device such as premise monitor and/or control device 102, but when other devices are leveraged such as smart phones, then difficulties arise in determining access privileges or the like. One solution is to create a remote management account with credentials that belong to one user (e.g., an accountholder) that can be shared with other users. However, in that case, several additional issues arise. For example, notifications (e.g., based on an accountholder email address) will typically only go to one party, or a given party is not likely to receive a specific notification. Also, customized preferences become difficult or impossible, such as programming a first set of preferences when only party A is at premises 104 and a second set of preferences when only party B is at premises 104 and a third set of preferences when both party A and B are at premises 104. Furthermore, security hazards arise since an authentication credential is shared, particularly when one of the parties is only a temporary user of premises 104 (e.g., a houseguest) or only has access to a portion of premises 104. In addition, access is an all-or-nothing proposition because by sharing the credential each user has access to all options and data as every other user.

According to the disclosed subject matter a different solution can be provided. Rather than sharing an account credential, each user can be provided separate accounts, which might include many premises or portions that do not have joint access even if joint access does exist for premises 104. Hence, the concept of sharing disclosed herein minors use or ownership concepts associated with premises or portions of premises. Thus, an account can exist for, say, a homeowner, and another for the homeowner's spouse, and yet another for the homeowner's child, where the child's account might only include access privileges associated with his or her room or an entertainment room. Likewise, another account can be created for a houseguest with privileges associated with a guest room only. The homeowner can stop sharing premises 104 with the houseguest at any time, and can do so without sharing and/or later changing a password. Additionally or alternatively, the houseguest can remove his or her access as well (e.g., at the end of the stay) or the access can be provided for a predetermined period of time, after which access privileges can be automatically terminated.

Furthermore, the homeowner can open sharing to anyone at premises 104. For example, users who connect to a local WI-FI network can be granted access and the ability to input information to device 102. Such access can end when that particular user leaves premises 104 and/or goes beyond the range of the local WI-FI network. Such a feature can also provide for automatic changes based on presence and/or proximity to premise 104 by a particular user. For example, two users who share a location might have independent device settings (e.g., thermostat temperature). When combined with proximity detection, smart devices, such as system 100 in some embodiments, can automatically adjust to the settings desired for the current occupants of premises 104 or those users that are approaching and near to premises 104. Similarly, when all users of premises 104 are absent, system 100 can facilitate the away mode that can include not only efficiency settings but also arming security systems, etc.

Due to the networking, integration, and other capabilities that can be provided by device 102, conventional "dumb" thermostats and other premises monitor and control devices can be used as though they were full-featured smart devices. Moreover, conventional programmable thermostats and other premises monitor devices typically require a more complex user interface than the standard up/down buttons or round dial of the non-programmable thermostats. However, more complex user interfaces generally equate to a more expensive product such as more LCD segments or pixels on the display, more buttons, switches, or toggles, etc. Furthermore, enhancing features associated with remotely controlling premises monitor and/or control devices can introduce synchronization issues. For example, suppose an operation schedule is edited both remotely and on the device with conflicting inputs, or when the device is offline.

One potential solution is for a remote host to manage the schedule of the communicating device such that there is limited ability to change the schedule locally. Even though the schedule exists remotely, changes can be effectuated from devices at premises 104 (e.g., a web browser or mobile application connected to the remote system). Such avoids the potential local versus remote schedule conflict issue, and premises monitor and/or control device 102 itself can still allow for relatively simple or short-term overrides locally such as the case where a user wants to temporarily override a current scheduled setting (e.g., it's too hot right now) or hold, enable, or disable a scheduled setting. Therefore, parties without access to devices with sophisticated user interfaces (e.g., children, visitors, etc.) who have need to change the settings associated with device 102 can still have access to non-scheduling functions available through the simple user interface on device 102 or devices connected to device 102 such as raising or lowering a temperature threshold or starting or stopping a programmed schedule to hold current settings. By designing local monitor and control devices with limited user interface functionality, such devices can be particularly inexpensive, while very sophisticated user interfaces associated with other devices of a user can be employed to access the remote host allowing for a very rich feature set.

Moreover, even though local device (e.g., device 102 or a device that device 102 interfaces with) schedules are not fully editable through the local device's user interface alone, the local device can still store all or a portion of the schedule. In fact, the local device memory can be reduced to be a minimum to hold only a few elements of threshold data (e.g., a threshold and a transition time), which can drive costs down further. In that case, the remote host can feed threshold data to the local device at appropriate times, continually overwriting previous information to effectuate the complete schedule with minimal local memory. Such can also provide for adaptive recovery and failure prevention techniques that are not available for non-programmable monitor and control devices, such a non-programmable thermostat. Adaptive recovery relates to a feature in which a state (e.g., an ambient temperature) associated with premises 104 or a portion thereof reaches a threshold at the transition time as opposed to activating the state control device at the transition time, which can in some cases increase efficiency or occupant comfort. Failure prevention relates to a feature that can mitigate issues associated with a loss of communication between a local device and the remote host, especially in cases where the local device is a slave to the remote host and relies on the remote host to provide it with updated state or threshold information precisely at the transition time. With a portion of the schedule stored on the local device, transitions can still occur according to a most recent schedule stored in local memory. Additionally or alternatively, a "failure" schedule can be included to handle various situations such as long-term communication loss.

Furthermore, by managing the schedule at the remote host, the ability to perform sophisticated metrics in connection with very inexpensive local devices becomes feasible. For example, the remote host can analyze inputs associated with local overrides or inputs to detect, e.g., a user tends to change from 72 degrees to 76 degrees at 6 pm on weekdays. By determining this pattern, the remote host can automatically update the schedule and/or notify the user of the suggested update to the schedule.

Gateway Service and Provisioning Feature Enhancements

Provisioning premises monitor and control devices such as smart thermostats or wireless sensors can be difficult without a sophisticated user interface and data entry method that are appropriate to the provisioning aspect as well as the normal operation of the device after it has been provisioned and otherwise set up. Such devices do not typically have a fully interactive user interface to provide feedback and/or directions to users. Often there is no display at all associated with the user interface of the device because graphical user interfaces equate to additional expense. Moreover, because these devices are often "smart" devices that communicate with a server or other local smart devices, local user interface features are often omitted to reduce costs or the like. However, such can lead to difficulty when provisioning the device for communication setup.

One solution to this difficulty is to implement a first set of indicators such as light-emitted diode (LED) elements on the smart device and a second set of LED elements on an associated gateway/bridge. The two sets of LED elements can be coordinated and/or sequenced to provide feedback associated with where in the sequence the setup process is and/or how the setup process is progressing. In some embodiments, all smart devices and user interfaces in the ecosystem can use a common set of iconography to indicate progress. Moreover, it is noted that LED elements are typically of very low cost, yet in situations as those described above, the information a few LED elements (or other suitable indicators) can provide can be quite beneficial to users or service personnel.

For devices that are to be connected to multiple other devices, the associated indicators can show service status such as that for a wide area network, local devices, remote server 1, remote server 2, etc. Instead of implementing a single LED to indicate the overall health of the system, individual communication connection indicators can be advantageous for efficient setup and in the case of setup difficulties. Furthermore, smart devices can bridge two or more protocols such as, for example, WI-FI on one side and ZigBee Smart Energy on the other. As another example, the smart device can bridge two or more networks such as a network associated with a metering device or energy provider and a network associated with a home (e.g., a home automation network). The above-mentioned indicators (e.g., LED elements) can be employed to indicate communication activity on both sides of a communication bridge. For example, indicators on the smart device can represent the status of each of the multiple protocols or networks independently, which can expedite setup and/or mitigate troubleshooting issues.

Likewise, consider the scenario in which multiple smart devices are to be provisioned to a network. In those cases, it can be difficult to connect smart devices to the appropriate network. For example, connecting a limited user interface device to a home WI-FI network might require: 1) connecting to that device directly; 2) providing the device with the WI-FI network information; 3) disconnecting from the device; and possibly, 4) downloading WI-FI credentials to a flash drive or other suitable data storage device and booting the device with the flash drive connected. Since multiple devices are being employed, these or similar steps conventionally must be repeated for each device. Thus, setup of N devices typically requires N*t, where t is the time to set up a single device, which can be tedious and time-consuming, yet might be necessary when installing a broad home control solution or when replacing existing premises monitor and/or control devices with communicating, smart devices.

One potential solution to these difficulties can be to connect a first device to the network according to the above process or another suitable means. Once the first device is operating correctly, a copy-settings feature can be implemented. The copy-settings feature can include a security measure and can operate to transfer the correctly configured settings from the first device to the second device. The copy-settings feature can be invoked, for example, by pressing a button or other user interface element on one of the two devices after which a security time window (e.g., 30 seconds) exists for a similar button to be pressed on the other of the two devices. Assuming both buttons are pressed within the security time window, the configuration information can be copied to the second device, which can then be authenticated to the network. Such can potentially simplify setup and/or significantly reduce setup time for the multiple devices. It is appreciated that the security time window is merely one example. Such devices can be pre-programmed to have a secure method of exchanging network information, which can be according to any suitable means known in the art.

As yet another example enhancement associated with smart devices, consider the case of a smart appliance or other device that is advantageously intended to exchange information with multiple services. For example, the device might be intended to support consumer remote control functionality from service provider A; demand response functionality from service providers B and C; and operational information and/or diagnostic functionality from service provider D. Unfortunately, most smart devices today are designed to communicate by way of a client/server model with only one (preconfigured) remote service.

Based on the single-server model, even if the single server can pass-through services from other providers, industry observers worry about the significant potential for stranded assets in the event the single service provider fails to provide the service adequately or at all. On the other hand, enabling a multiple server model can lead to other difficulties such as the potential for conflicts similar to those detailed above in connection with scheduling conflicts. For example, consider the case in which demand response information or directives communicated to the smart device from provider B differ from those issued by provider C. Or the case in which demand response information communicated to the smart device from provider B or C conflict with user remote control commands communicated from provider A. As another example, consider a deeper level of abstraction, where a question arises as to whether "emergency" demand response information is handled differently than standard economic demand response information such as where one might take priority in conflicts, even if the other does not.

One potential solution to theses and other difficulties is to implement a multiple server model in connection with the smart device such that the smart device can receive multiple services from multiple providers rather than being configured to receive services directly from only a single provider. Conflict resolution can be managed locally according to determined settings, potentially selectable or configurable by the user. However, conflict resolution and other status information can be reported back to the relevant providers.

Figure 9:
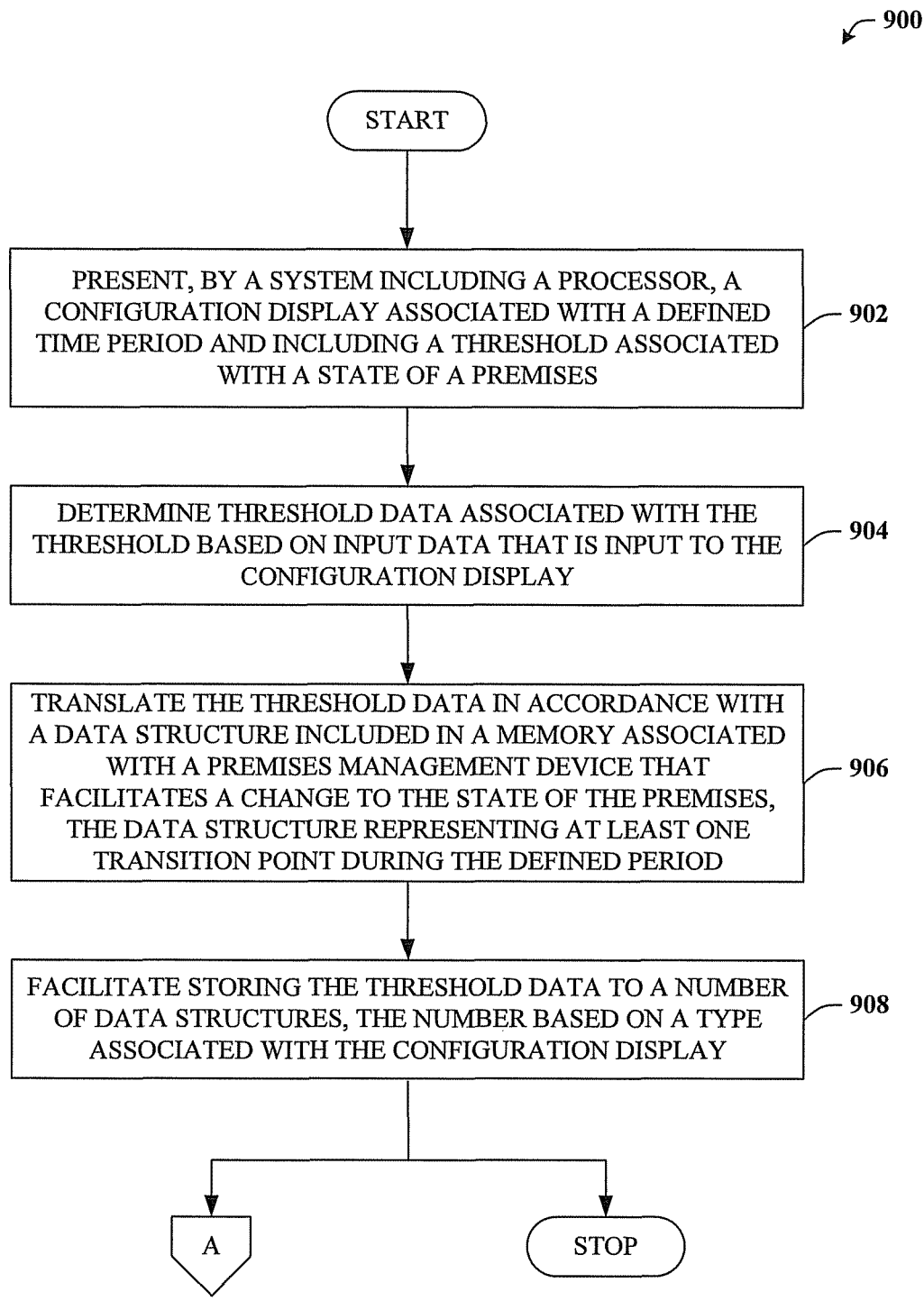
FIG. 9 illustrates an example methodology for providing for simplifying schedule programming of a premises management device.
Figure 10:
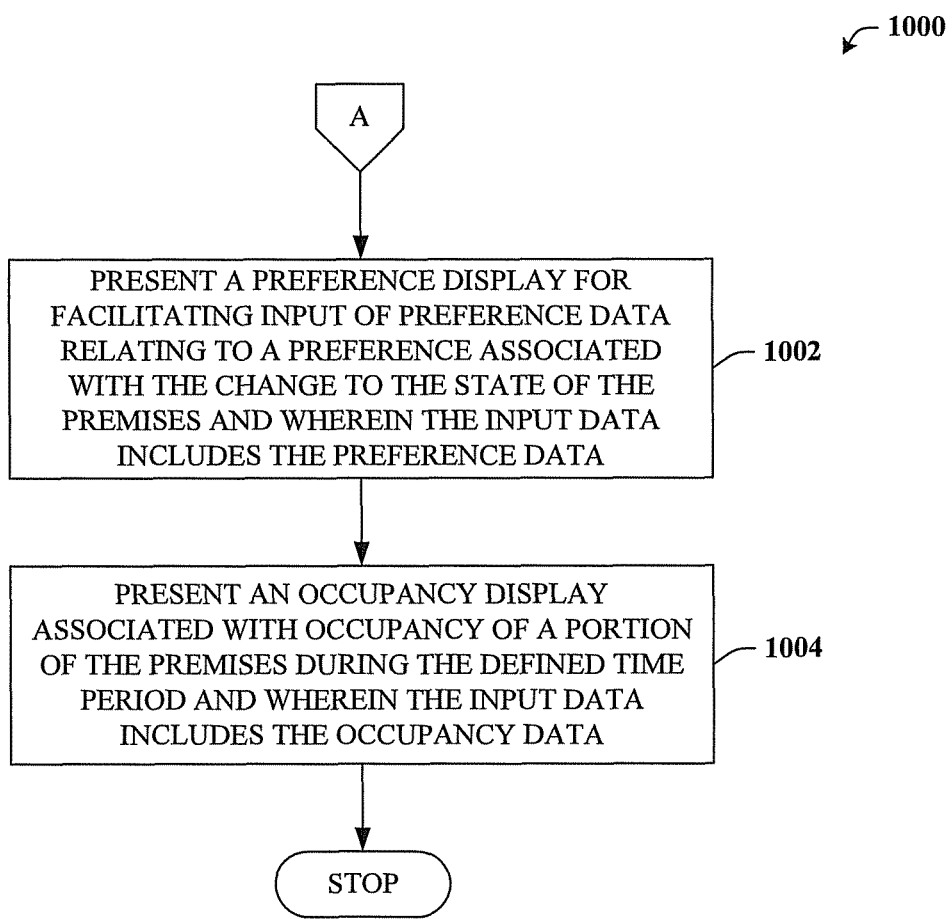
FIG. 10 illustrates an example methodology for providing for additional aspects or features in connection with simplifying schedule programming for a premises management device in accordance with certain embodiments of this disclosure.

FIGS. 9-10 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Referring now to FIG. 9, exemplary method 900 is illustrated. Method 900 can provide for simplifying schedule programming for a premises management device. Generally, at reference numeral 902, a configuration display associated with a defined time period and including a threshold associated with a state of premises can be presented by a system including at least one processor. For example, the threshold can relate to an air or water temperature or quality of the premises.

At reference numeral 904, threshold data associated with the threshold can be determined based on input data that is input to the configuration display or derived from input to the configuration display as well as from other sources. For example, threshold data can include the threshold (e.g., temperature) and a transition time at which the threshold becomes "active" (e.g., at 7:00 am the threshold is set to 75 degrees), which can be based upon other data as well.

At reference numeral 906, the threshold data can be translated in accordance with a data structure included in a memory associated with a premises management device (e.g., a thermostat) that facilitates a change to the state of the premises. The data structure can be configured to represent at least one transition point occurring during the defined time period. For example, if the defined time period is a day and the memory of the premises management device supports up to four setpoints for each day, then the threshold data can be translated for compliance with the memory, even if a different configuration or format is presented by the configuration display.

At reference numeral 908, storage of the threshold data to a number of data structures of the memory can be facilitated. The number can be based on a type associated with the configuration display. For example, a first type of configuration display might indicate that the number is a first value, whereas a second type of configuration display might indicate that the number is a second value, possibly different from the first value.

With reference to FIG. 10, exemplary method 1000 is depicted. Method 1000 can provide for additional aspects or features in connection with simplifying schedule programming for a premises management device. At reference numeral 1002, a preference display for facilitating input of preference data relating to a preference associated with the change to the state of the premises can be presented. Hence, in some embodiments, the preference data can be included in the input data detailed in connection with reference numeral 904 of FIG. 9. By way of illustration, the preference display can relate to various preferences or settings desired by a user. Such information can be employed to determine settings in a manner that can be simplified. For example, a user that inputs preference data that indicates the user is interested in efficiency over comfort can lead to different threshold data determinations than similar preference data from a user that indicates a preference of comfort versus efficiency.

At reference numeral 1004, an occupancy display associated with occupancy of a portion of the premises during the defined time period can be presented. As with preference data, occupancy data can also be included in the input data described at reference numeral 904. Thus, occupancy data can be employed in the determination of threshold data. For example, consider the case in which a schedule indicates a threshold should be a particular value at a particular time. However, based on occupancy data (e.g., a particular is/is not present at the premises), that threshold can be modified within the schedule data.

Example Operating Environments

Figure 11:
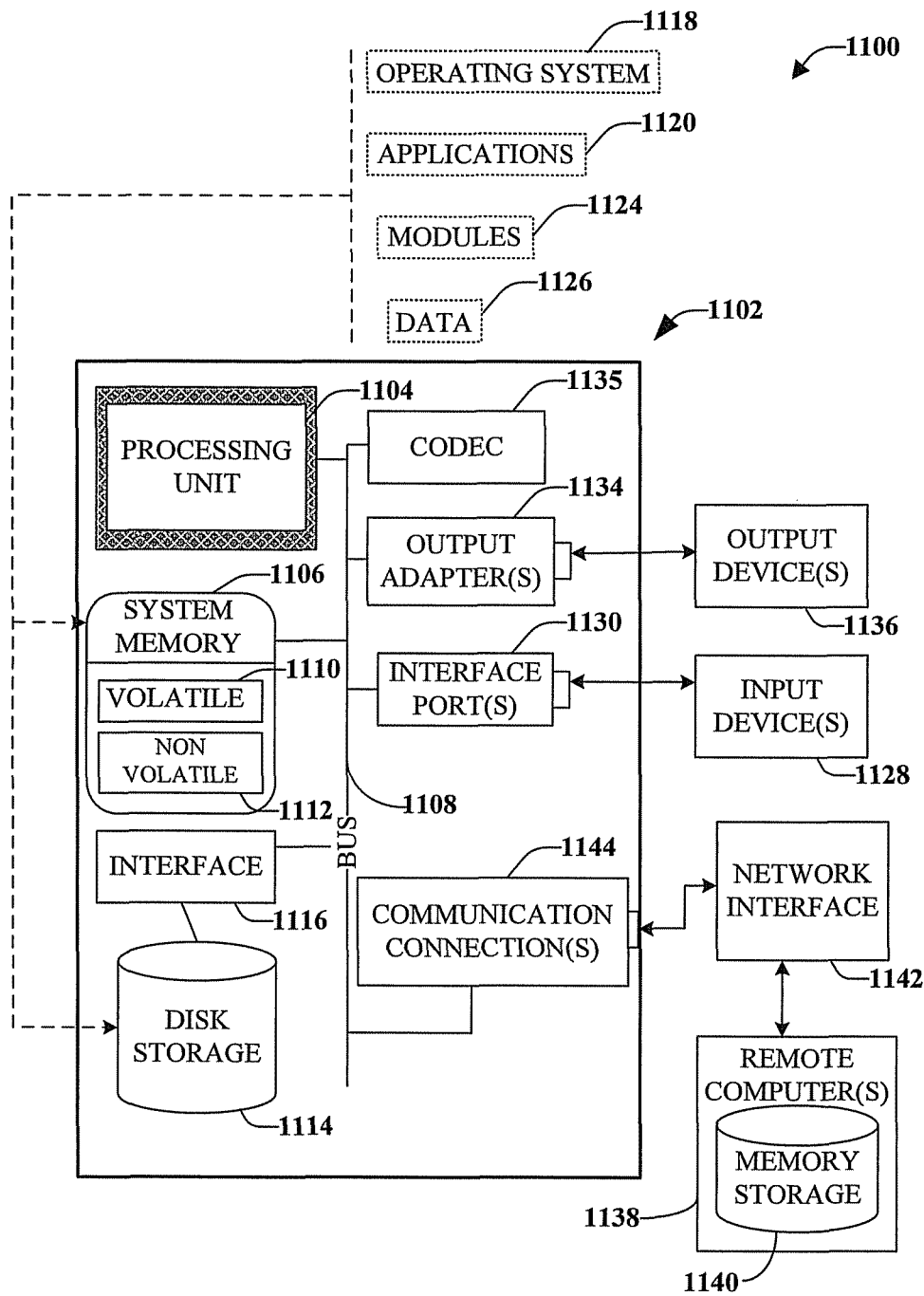
FIG. 11 illustrates a block diagram of a computer operable to execute or implement all or portions of the disclosed architecture in accordance with certain embodiments of this disclosure.

With reference to FIG. 11, a suitable environment 1100 for implementing various aspects of the claimed subject matter includes a computer 1102. The computer 1102 includes a processing unit 1104, a system memory 1106, a codec 1135, and a system bus 1108. The system bus 1108 couples system components including, but not limited to, the system memory 1106 to the processing unit 1104. The processing unit 1104 can be any of various available processors. Dual microprocessors and other multiprocessor architectures also can be employed as the processing unit 1104.

The system bus 1108 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1106 includes volatile memory 1110 and non-volatile memory 1112. The basic input/output system (BIOS), containing the basic routines to transfer information between elements within the computer 1102, such as during start-up, is stored in non-volatile memory 1112. In addition, according to present innovations, codec 1135 may include at least one of an encoder or decoder, wherein the at least one of an encoder or decoder may consist of hardware, a combination of hardware and software, or software. Although, codec 1135 is depicted as a separate component, codec 1135 may be contained within non-volatile memory 1112. By way of illustration, and not limitation, non-volatile memory 1112 can include read only memory (ROM), programmable ROM (PROM), electrically programmable ROM (EPROM), electrically erasable programmable ROM (EEPROM), or flash memory. Volatile memory 1110 includes random access memory (RAM), which acts as external cache memory. According to present aspects, the volatile memory may store the write operation retry logic (not shown in FIG. 11) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 1102 may also include removable/non-removable, volatile/non-volatile computer storage medium. FIG. 11 illustrates, for example, disk storage 1114. Disk storage 1114 includes, but is not limited to, devices like a magnetic disk drive, solid state disk (SSD) floppy disk drive, tape drive, flash memory card, or memory stick. In addition, disk storage 1114 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1114 to the system bus 1108, a removable or non-removable interface is typically used, such as interface 1116.

It is to be appreciated that FIG. 11 describes software that acts as an intermediary between users and the basic computer resources described in the suitable operating environment 1100. Such software includes an operating system 1118. Operating system 1118, which can be stored on disk storage 1114, acts to control and allocate resources of the computer system 1102. Applications 1120 take advantage of the management of resources by operating system 1118 through program modules 1124, and program data 1126, such as the boot/shutdown transaction table and the like, stored either in system memory 1106 or on disk storage 1114. It is to be appreciated that the claimed subject matter can be implemented with various operating systems or combinations of operating systems.

A user enters commands or information into the computer 1102 through input device(s) 1128. Input devices 1128 include, but are not limited to, a pointing device such as a mouse, trackball, stylus, touch pad, keyboard, microphone, voice recognition microphone, joystick, game pad, satellite dish, scanner, TV tuner card, digital camera, digital video camera, web camera, and the like. These and other input devices connect to the processing unit 1104 through the system bus 1108 via interface port(s) 1130. Interface port(s) 1130 include, for example, a serial port, a parallel port, a game port, and a universal serial bus (USB). Output device(s) 1136 use some of the same type of ports as input device(s) 1128. Thus, for example, a USB port may be used to provide input to computer 1102 and to output information from computer 1102 to an output device 1136. Output adapter 1134 is provided to illustrate that there are some output devices 1136 like monitors, speakers, and printers, among other output devices 1136, which require special adapters. The output adapters 1134 include, by way of illustration and not limitation, video and sound cards that provide a means of connection between the output device 1136 and the system bus 1108. It should be noted that other devices and/or systems of devices provide both input and output capabilities such as remote computer(s) 1138.

Computer 1102 can operate in a networked environment using logical connections to one or more remote computers, such as remote computer(s) 1138. The remote computer(s) 1138 can be a personal computer, a server, a router, a network PC, a workstation, a microprocessor based appliance, a peer device, a smart phone, a tablet, or other network node, and typically includes many of the elements described relative to computer 1102. For purposes of brevity, only a memory storage device 1140 is illustrated with remote computer(s) 1138. Remote computer(s) 1138 is logically connected to computer 1102 through a network interface 1142 and then connected via communication connection(s) 1144. Network interface 1142 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1144 refers to the hardware/software employed to connect the network interface 1142 to the bus 1108. While communication connection 1144 is shown for illustrative clarity inside computer 1102, it can also be external to computer 1102. The hardware/software necessary for connection to the network interface 1142 includes, for exemplary purposes only, internal and external technologies such as, modems including regular telephone grade modems, cable modems and DSL modems, ISDN adapters, and wired and wireless Ethernet cards, hubs, and routers.

Figure 12:
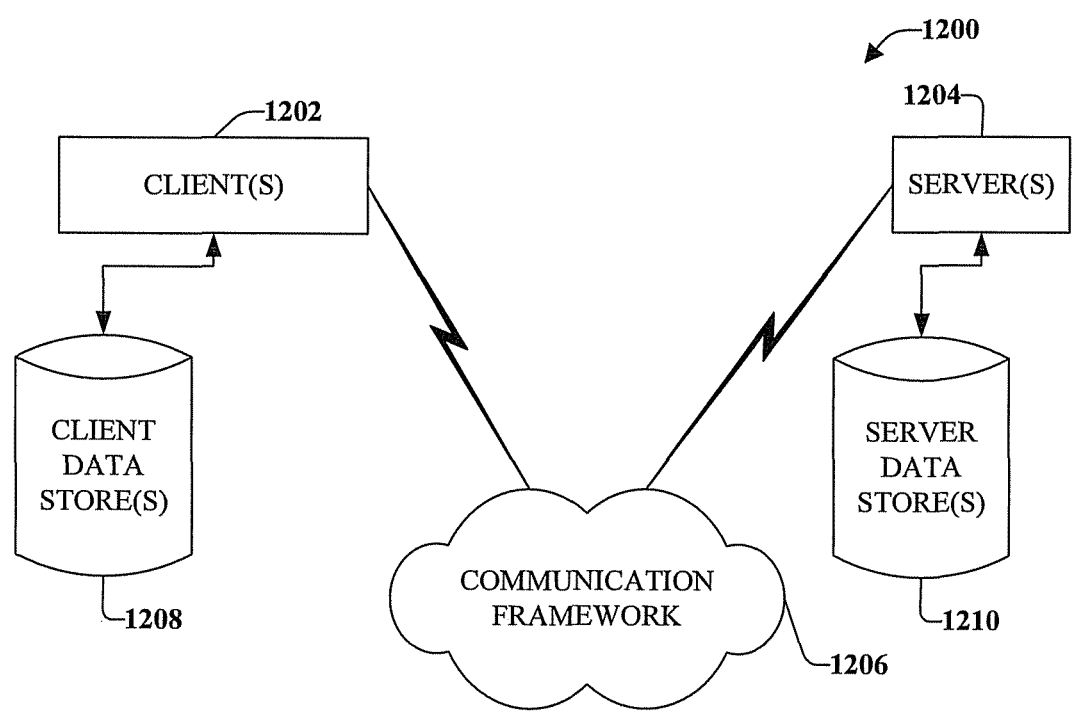
FIG. 12 illustrates a schematic block diagram of an exemplary computing environment in accordance with certain embodiments of this disclosure.

Referring now to FIG. 12, there is illustrated a schematic block diagram of a computing environment 1200 in accordance with this specification. The system 1200 includes one or more client(s) 1202 (e.g., laptops, smart phones, PDAs, media players, computers, portable electronic devices, tablets, and the like). The client(s) 1202 can be hardware and/or software (e.g., threads, processes, computing devices). The system 1200 also includes one or more server(s) 1204. The server(s) 1204 can also be hardware or hardware in combination with software (e.g., threads, processes, computing devices). The servers 1204 can house threads to perform transformations by employing aspects of this disclosure, for example. One possible communication between a client 1202 and a server 1204 can be in the form of a data packet transmitted between two or more computer processes. The data packet can include a cookie and/or associated contextual information, for example. The system 1200 includes a communication framework 1206 (e.g., a global communication network such as the Internet, or mobile network(s)) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A premises monitor and control device that facilitates a change to a state of a premises, comprising:
   a processor that executes or facilitates execution of computer executable components stored in a first memory, the computer executable components comprising:
      a presentation component that presents:
         a selection display comprising user-selectable schedule types indicative of types of schedule arrangements over a defined time period representing a week that includes sub-periods representing a day; and
         a configuration display comprising a threshold setting for the state of the premises during a sub-period of the sub-periods; and
      a data component that:
         determines a number n in response to input to the selection display representing selection of a schedule type from among the user-selectable schedule types, wherein n is between two and a count of the sub-periods in the week; and
         determines threshold data based on input data input to the threshold setting of the configuration display for the sub-period; and
      a population component that populates n data structures included in a second memory of a premises state control device with the threshold data, wherein a data structure from the data structures relates to a single sub-period of the week.

2. The premises monitor and control device of claim 1, wherein the threshold data includes the input data and a transition time input to the configuration display that represents a time within the sub-period at which the threshold setting becomes active.

3. The premises monitor and control device of claim 1, further comprising a communication component that communicates with the premises state control device that controls the state of the premises, wherein the premises state control device is physically remote from the premises monitor and control device.

4. The premises monitor and control device of claim 1, wherein the data component stores n and the threshold data to a memory of the premises monitor and control device.

5. The premises monitor and control device of claim 1, wherein the schedule type is:
   a 5-2 period display that facilitates input of: a first set of input data from which the data component determines the threshold data that the population component utilizes to populate five data structures included in the second memory and a second set of input data from which the data component determines the threshold data that the population component utilizes to populate two data structures included in the second memory;
   a 5-1-1 period display that facilitates input of: a first set of input data from which the data component determines the threshold data that the population component utilizes to populate five data structures included in the second memory, a second set of input data from which the data component determines the threshold data that the population component utilizes to populate one data structure included in the second memory, and a third set of input data from which the data component determines the threshold data that the population component utilizes to populate one data structure included in the second memory; or
   a 7 period display that facilitates input of the input data from which the data component determines the threshold data that the population component utilizes to populate seven data structures included in the second memory.

6. The premises monitor and control device of claim 1, wherein the presentation component presents a preference display that facilitates input of preference data that relates to a preference associated with the change to the state of the premises and wherein the data component determines the threshold data further based on the preference data.

7. The premises monitor and control device of claim 1, wherein the presentation component presents an occupancy display associated with occupancy of a portion of the premises during the defined time period and wherein the data component determines the threshold data further based on occupancy data input to the occupancy display.

8. The premises monitor and control device of claim 1, wherein the premises monitor and control device facilitates changes to at least one heating, ventilation and air conditioning (HVAC) device.

9. A non-transitory computer readable storage medium storing computer executable instructions that, in response to execution, cause a device comprising a processor to perform operations, comprising:
   presenting a selection display comprising schedule types indicative of types of user-selectable schedules indicative of a week and including sub-periods indicative of a day;

in response to input to the selection display that selects a schedule type, determining a number between two and a number of sub-periods in the week that is indicative of the schedule type;

presenting a configuration display according to the schedule type including at least one threshold for a state of a premises;

determining threshold data associated with the at least one threshold based on input data input to the configuration display;

formatting the threshold data for a data structure included in a first memory of a premises management device that facilitates a change to the state of the premises, the data structure representing at least one transition point during a sub-period of the sub-periods; and facilitating copying the threshold data to the number of data structures of a second memory included in a premises state management device.

10. The computer readable storage medium of claim 9, wherein the threshold data includes the threshold and a transition time within the sub-period at which the threshold becomes active.

11. The computer readable storage medium of claim 9, further comprising storing the number to the first memory.

12. The computer readable storage medium of claim 11, wherein the user-selected type is:
a 5-2 period display that facilitates input of: a first set of input data from which first threshold data is determined and the number of data structures populated with the first threshold data is five and a second set of input data from which second threshold data is determined and the number of data structures populated with the second threshold data is two;
a 5-1-1 period display that facilitates input of: a first set of input data from which first threshold data is determined and the number of data structures populated with the first threshold data is five, a second set of input data from which second threshold data is determined and the number of data structures populated with the second threshold data is one, and a third set of input data from which third threshold data is determined and the number of data structures populated with the third threshold data is one; or
a 7 period display that facilitates input of the input data from which the threshold data is determined and the number of data structures populated with the threshold data is seven.

13. The computer readable storage medium of claim 9, wherein the configuration display includes a preference display that facilitates input of preference data relating to a preference associated with the change to the state of the premises and wherein the input data includes the preference data.

14. The computer readable storage medium of claim 13, wherein the preference display includes a user interface adjustment mechanism, with selectable settings ranging between two opposing metrics associated with an abstraction of the state of the premises, and wherein a selected setting from the selectable settings is translated from an abstract metric relating to the two opposing metrics to a quantitative value that is employed to update the threshold data.

15. The computer readable storage medium of claim 9, wherein the configuration display includes an occupancy display that displays, or facilitates input of, occupancy data associated with occupancy of a portion of the premises during the sub-period and wherein the input data includes the occupancy data.

16. The computer readable storage medium of claim 9, wherein the premises management device facilitates changes to at least one heating, ventilation or air conditioning device.

17. The computer readable storage medium of claim 9, wherein the device including the processor is included in the premises management device or a server device that is communicatively coupled to the premises management device.

18. A method, comprising:
facilitating, by a system comprising a processor, presentation of a selection display comprising user-selectable schedule types indicative of types of schedule arrangements over a seven-day period, wherein a first type of the user-selectable schedule types groups days of the seven-day period differently than a second type of the user-selectable schedule types;

determines a number in response to input to the selection display representing selection of a schedule type from among the user-selectable schedule types, wherein the number is between two and seven;

facilitating presentation of a configuration display that is selected from multiple user-selected types of different configuration displays based on input to the selection display, wherein the configuration display enables configuration of a threshold of a state of a premises over the seven-day period;

determining threshold data associated with the threshold based on input data that is input to the configuration display;

translating the threshold data in accordance with a data structure included in a memory of a premises state control device that facilitates a change to a state of a premises, wherein the data structure represents at least one transition point during the seven-day period; and facilitating storing the threshold data to the number of data structures of the premises state control device.

19. The method of claim 18, further comprising presenting a preference display for facilitating input of preference data relating to a preference associated with the change to the state of the premises and wherein the input data includes the preference data.

20. The method of claim 18, further comprising facilitating presentation of an occupancy display that presents, or facilitates input of, occupancy data associated with occupancy of a portion of the premises during the seven-day period and wherein the input data includes the occupancy data.

* * * * *